United States Patent [19]

Danckert

[11] Patent Number: 4,743,136
[45] Date of Patent: May 10, 1988

[54] TRACTION-AND PRESSURE-TRANSMITTING LINK JOINT BETWEEN TWO COMPONENT PARTS EXECUTING JOINT MOVEMENTS, IN PARTICULAR PISTON ROD AND CONNECTING ROD

[75] Inventor: Hermann Danckert, Wolfsburg, Fed. Rep. of Germany

[73] Assignee: Volkswagen AG, Wolfsburg, Fed. Rep. of Germany

[21] Appl. No.: 47,424

[22] Filed: May 6, 1987

[30] Foreign Application Priority Data

May 6, 1986 [DE] Fed. Rep. of Germany ....... 3615258

[51] Int. Cl.[4] .............................................. F16J 1/16
[52] U.S. Cl. ................... 403/150; 403/154; 74/579 E; 92/187
[58] Field of Search ................. 403/150, 151, 154; 74/579 E; 92/187

[56] References Cited

U.S. PATENT DOCUMENTS 1,627,775  5/1927  Hollett ........................... 74/579 E
4,544,299 10/1985  Danckert ........................ 403/150

FOREIGN PATENT DOCUMENTS 1292445  4/1969  Fed. Rep. of Germany ........ 92/187

Primary Examiner—Andrew V. Kundrat
Attorney, Agent, or Firm—Brumbaugh, Graves, Donohue & Raymond

[57] ABSTRACT

A link joint containing, between two component parts to be connected pivotably, a tension ring placed in corresponding cavities in the component parts extending from a pin, which tension ring, in addition to the pin on which the component parts bear with opposing bearing surfaces, encloses a tension pin which extends fully within one of the component parts and parallel to the pin axis.

4 Claims, 1 Drawing Sheet

TRACTION-AND PRESSURE-TRANSMITTING LINK JOINT BETWEEN TWO COMPONENT PARTS EXECUTING JOINT MOVEMENTS, IN PARTICULAR PISTON ROD AND CONNECTING ROD

BACKGROUND OF THE INVENTION

The invention concerns a tension and pressure transmitting link joint between two component parts executing joint movements, in particular between the piston rod and the connecting rod, of an internal combustion engine, with a pin arranged perpendicular to the direction of pressure and tension, on which pin are supported bearing regions of both component parts which are placed opposite relative to the pin axis. The bearing regions extend each only over a part of the pin circumference and together over less than 360°, whereby the holding-together of the pin and the two component parts is ensured by at least one ring surrounding the pin. In the link joints of this kind, known from DE-OS No. 33 18 215, two rings enclose the pin in this joint region, laterally with respect to the component parts proper, in particular a gudgeon pin boss and a connecting rod boss. This requires a relatively wide construction of the said component parts in the link joint region which may be undesirable, e.g., in the case of a link joint between piston and connecting rod. As retaining device for the ring serves a retaining pin which extends parallel to the pin axis and is tapered towards one end, which retaining pin is driven into the connecting rod. In the constructions described in the aforementioned Offenlegungsschrift, the retaining pin projects laterally with its tapered end beyond the connecting rod and the ring so that thereby, too, is caused an enlargement of the dimensions of the link joint.

SUMMARY OF THE INVENTION

It is the object of the invention to provide a link joint which includes the fundamental advantages of the prior art link joint previously described, in particular the eliminating of troubling bending moments, but is narrower in its construction than the prior art constructions.

Pursuant to this object, and others which will become apparent hereafter, one aspect of the present invention resides in a link joint as previously described wherein a first component part encloses a bearing region of the second component part in a fork-like manner by way of eye-like mountings for the pin. The bearing region of the second component part as well as a bearing region of the first component part, which is opposite the second component part bearing region relative to the pin axis, are provided with corresponding cavities extending from the pin for accommodating a ring supported unilaterally directly on the pin.

Thus, in accordance with the invention, the ring is arranged within the component parts and thereby integrated therewith, as it were, so that neither the lodging of the ring nor the tension pin require any space to the side of the component parts to be connected in the region of the link joint.

An example of an embodiment of the invention for the case of a swivel connection between a piston and a connecting rod is explained in the following with reference to the drawing.

DETAILED DESCRIPTION OF THE PREFERRED EMBODIMENTS

Figures 1, 2, 3:
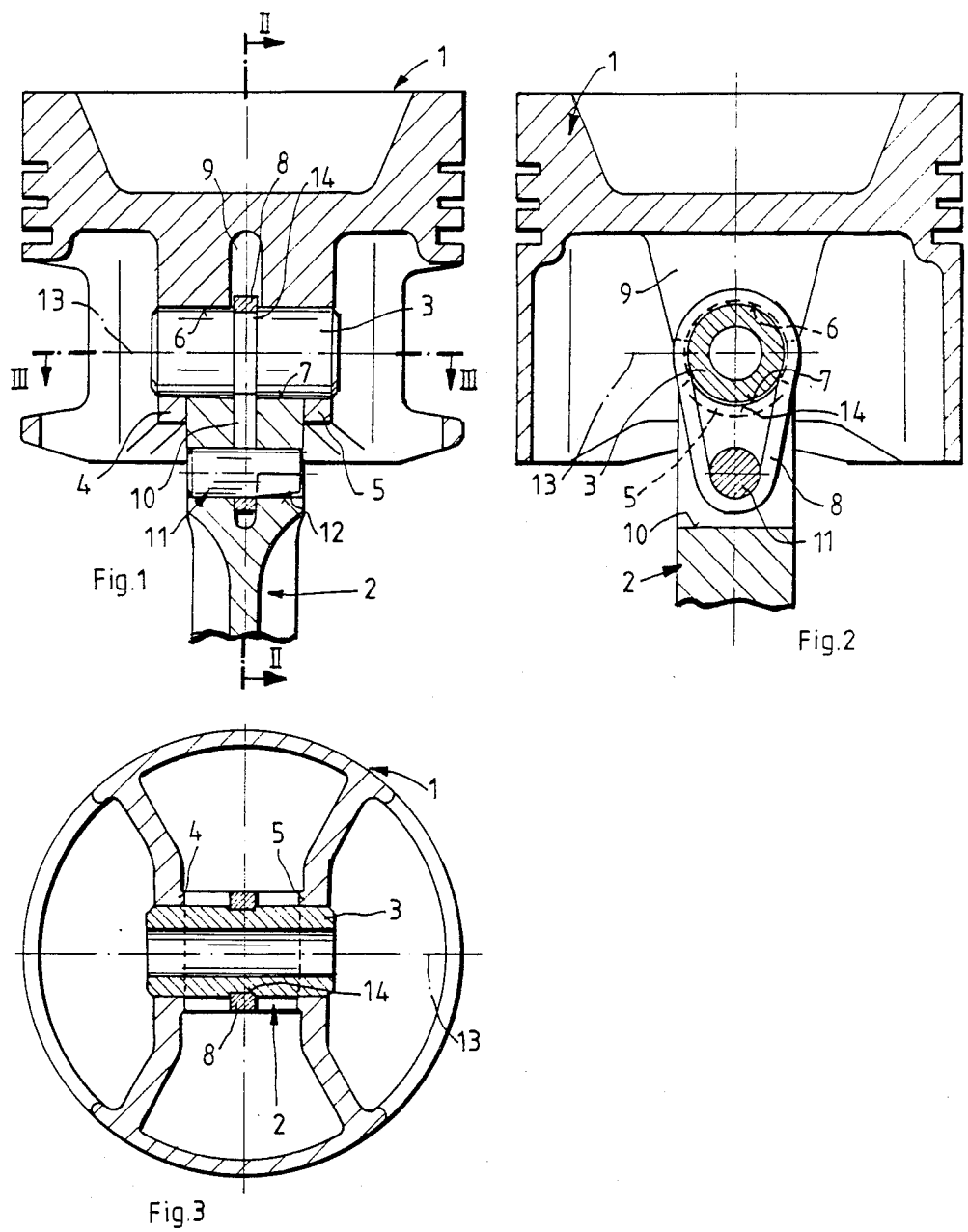
FIG. 1 shows a vertical section through a link joint pursuant to the present invention in a plane perpendicular to the swivel motion between these two component parts.
FIG. 2 is a section according to II—II in FIG. 1.
FIG. 3 is a horizontal section marked by III—III in FIG. 1.

As can be seen from the drawing, the component parts to be connected are a piston -1- of an internal combustion engine, not otherwise shown, and a connecting rod -2-. The central element of the link joint is a gudgeon pin -3- which passe through eye-like mounting regions -4- and -5- of the piston -1- and on which bear the component parts with bearing regions -6- and -7-. These two bearing regions -6-, -7- are opposite each other and extend, as shown in detail in FIG. 2, in each case over less than 180° and together over less than 360° so that the swivel connection permits relative swivelling between the piston -1- and the connecting rod -2-. The eye-like mountings -4- and -5- enclose the bearing region -7- between them in a fork-like manner.

The component parts -1- and -2- are held together by a ring -8- which may be made of metal or a known fiber material. The ring -8- is placed within the two component parts in corresponding cavities -9- and -10- extending from the pin periphery in the parts -1- and -2-. With its upper region, as shown in FIGS. 1 and 2, the ring -8- applies itself against the periphery of the pin -3- whereas its opposite, lower, region bears on a tension pin -11-. As indicated with the number -12-, the tension pin -11- tapers toward its right end as shown in FIG. 1 and extends parallel to the axis -13- of the pin -3-. Accordingly, the tension pin 11 is driven-in from the left, as shown in FIG. 1, so that its tapering end -12- increasingly tensions the ring -8- and thus increasingly holds together by tension the two component parts -1- and -2-.

In a further embodiment of the invention the ring may be guided in the pin by means of a groove -14-.

As shown in particular by FIG. 1, the ring -8- and tension pin -11- extend in their entirety within the component parts to be joined so that they do not protrude laterally therefrom and accordingly the component parts can be kept slim, especially the connecting rod -2-.

While the invention has been illustrated and described as embodied in a tension and pressure transmitting link joint, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

I claim:

1. An improved tension-and pressure-transmitting link joint between two component parts executing joint movements, in particular between the piston rod and the connecting rod, of an internal combustion engine, the link joint having a pin arranged perpendicular to the direction of pressure and tension, on which pin are supported bearing regions of both component parts which are opposite one another relative to the pin axis, which regions each extend only over a part of the pin circumference and together over less than 360° thereof, whereby holding-together of the pin and the two component parts is ensured by at least one ring surrounding the pin, the improvement comprising one of the component parts being provided so as to laterally enclose a bearing region of the other component part in a fork-like manner by means of eye-like mountings for the pin, the bearing region of the other component part as well as a bearing region of the one components part which is opposite the bearing region of the other component part relative to the pin axis being provided with corresponding cavities extending from the pin so as to accommodate the ring, a tension pin traversing the cavity in the other component part substantially parallel to the pin axis and tapering in the direction toward one of its ends, said ring being supportd solely by oppositely-directed surfces of the pin and the tension pin.

2. A link joint as defined in claim 1, characterized in that the at least one ring is a single ring provided so as to extend centrally in the component parts.

3. A tension-and pressure-transmitting link joint between a first and a second component part of an internal combustion engine which execute joint movement, comprising:
 a pin having an axis and circumference, and being arranged perpendicular to the direction of pressure and tension;
 a first bearing region in the first component part;
 a second bearing region in the second component part, said first and said second bearing regions being opposite one another relative to said pin axis and supported on said pin so as to each extend over a portion of said pin circumference, said bearing regions combined covering less than 360°;
 a tension pin provided in the second component part so as to be spaced from and essentially parallel to said pin axis; and
 at least one retaining member held under tension and engaging oppositely-directed surfaces of said pin and said tension pin to hold together the component parts, the first component part being formed with eye-like mountings of said pin so as to enclose said second bearing region of the secnd component part in a fork-like manner, said first and said second bearing region each being provided with a corresponding cavity extending from said pin so as to accommodate said at least one retaining member supported unilaterally directly on said pin.

4. A link joint as defined in claim 3, wherein said pin has a groove provided so as to guide said at least one retaining member.

* * * * *